United States Patent [19]

Speronello

[11] Patent Number: 4,790,929

[45] Date of Patent: Dec. 13, 1988

[54] HYDROTREATING PROCESS USING POROUS MULLITE

[75] Inventor: Barry K. Speronello, River Edge, N.J.

[73] Assignee: Engelhard Corporation, Edison, N.J.

[21] Appl. No.: 898,157

[22] Filed: Aug. 19, 1986

Related U.S. Application Data

[60] Division of Ser. No. 732,905, May 9, 1985, which is a continuation of Ser. No. 505,650, Jun. 20, 1983, abandoned.

[51] Int. Cl.$^4$ .................................................. C10G 45/08
[52] U.S. Cl. .......................... 208/216 PP; 208/216 R; 208/217; 208/251 H; 208/120
[58] Field of Search .............. 208/113, 106, 127, 111, 208/208 R, 209, 216 PP, 216 R, 120, 126, 217, 121-124, 112, 89, 59, 91, 108, 251 H; 502/84, 68

[56] References Cited

U.S. PATENT DOCUMENTS

| | | | |
|---|---|---|---|
| 2,530,122 | 1/1951 | Bertorelli et al. | 423/131 |
| 3,450,645 | 6/1969 | McEvoy | 502/68 |
| 3,622,500 | 11/1971 | Alpert | 208/110 X |
| 3,647,718 | 3/1972 | Haden, Jr. et al. | 502/68 |
| 3,657,154 | 4/1972 | Haden, Jr. et al. | 502/68 |
| 4,016,067 | 4/1977 | Fischer et al. | 208/89 |
| 4,022,682 | 5/1977 | Bludis et al. | 208/89 |
| 4,179,355 | 12/1979 | Frayer et al. | 208/89 |
| 4,227,995 | 10/1980 | Sze et al. | 208/251 H |
| 4,268,376 | 5/1981 | Foster | 208/121 X |
| 4,276,150 | 6/1981 | McHenry, Jr. | 208/120 |
| 4,280,898 | 7/1981 | Tatterson et al. | 208/113 X |
| 4,306,965 | 12/1981 | Hensley, Jr. et al. | 208/110 X |
| 4,328,091 | 5/1982 | Bartholic | 208/157 |
| 4,366,047 | 12/1982 | Winter et al. | 208/108 X |
| 4,440,632 | 4/1984 | Vassolos et al. | 208/113 |
| 4,442,223 | 4/1984 | Chester et al. | 502/263 X |
| 4,454,241 | 6/1984 | Pine et al. | 502/68 |
| 4,608,357 | 8/1986 | Silverman et al. | 502/84 |

*Primary Examiner*—Glenn Caldarola
*Attorney, Agent, or Firm*—Inez L. Moselle

[57] ABSTRACT

A process for treating heavy hydrocarbon oil which contains metals and/or sulfur in the presence of a catalyst and recovering a hydrocarbon product having reduced metals and/or sulfur content by employing a metal impregnated mullite catalyst. The impregnated metals are selected from the group consisting of cobalt, nickel, molybdenum and tungsten. The mullite supporting bodies are prepared by calcining bodies of kaolin clay until the clay is converted to mullite and free silica, leaching the resulting bodies of mullite and silica with an alkaline aqueous solution to remove the silica, washing the leached clay bodies to remove alkali ions, and drying.

1 Claim, No Drawings

HYDROTREATING PROCESS USING POROUS MULLITE

This is a divisional of co-pending application Ser. No. 06/732,905 filed on May 9, 1985, allowed, which is a continuation of Ser. No. 505,650 filed June 20, 1983, abandoned.

BACKGROUND OF THE INVENTION

This invention relates to novel porous mullite articles, the manufacture thereof and to the use of the porous mullite articles as contact materials and catalyst supports. The invention relates also to procedures for controlling the pore size distribution, total porosity and surface area of mullite bodies obtained by calcining preformed bodies of clay to form mullite and silica and removing silica from the mullite by leaching.

The thermal conversion of kaolin clay to mullite is well known in the ceramics art. A high purity kaolin clay can theoretically be converted by high temperature calcination into about 64% weight percent mullite. The remainder is an amorphous or crystalline silica, depending on the temperature. The addition of various sources of alumina such as bauxite increases the amount of mullite that can be obtained from a given amount of kaolin, thereby reducing the amount of free silica. Similarly, mullite obtained from various other sources of silica and alumina, such as kyanite or bauxite, will not necessarily contain free silica.

The mullitization reaction that takes place when kaolin clay is uitilized as the sole source of silica and alumina may be represented by the following equation where the approximate chemical formula for kaolin (without the water of hydration) is given as $Al_2O_3 \cdot 2SiO_2$, and the formula for mullite is $3Al_2O_3 \cdot 2SiO_2$:

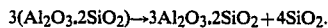

$$3(Al_2O_3.2SiO_2) \rightarrow 3Al_2O_3.2SiO_2 + 4SiO_2.$$

The term represented by $4SiO_2$ is the free silica generated as a result of the conversion to mullite.

Mullite is widely used in ceramic applications such as in the manufacture of refractory grains. For these applications, dense impervious products are needed and porosity is undesirable. See, for example, U.S. Pat. No. 3,642,505. It is known that a purified form of mullite can be obtained by calcining suitable clay such as kaolin, and extracting the silica with a strong base. See, for example, U.S. Pat. No. 2,536,122 and Japanese Patent Application No. 69 84,626 (CA81(10)53673a). It is my understanding that removal of the free silica in this fashion (or by reaction with sources of $Al_2O_3$) to form additional mullite is practiced to improve the refractoriness of the resultant solid. In this regard, it is noted that the $Al_2O_3$—$SiO_2$ phase diagram (Phase Diagrams for Ceramists, Amer. Cer. Soc. Ed., 1964, Diagrams 313-314) shows that pure mullite does not melt until about 1850° C.; however, in the presence of free silica, melting begins at only about 1600° C. Therefore, by eliminating free silica, the refractoriness of mullite is improved to an extent such that the melting point is about 250° C. higher.

With regard to the prior practice of removing silica from mullite produced by calcining clay, U.S. Pat. No. 2,536,122 describes grinding the clay after calcination and before the extraction step. It is reasonable to conclude that when the resulting leached mullite grains are formed into refractory articles, porosity in the finished articles is reduced by addition of binders and also by sintering procedures conventionally used in manufacturing mullite products. To the best of my knowledge and belief, there has been no acknowledgment or appreciation of the fact that mullite purification by removal of silica from mullitized kaolin would change the structure of the mullite, resulting in a form of mullite of controllable pore structure to provide novel porous bodies.

Recent patent literature is abundant in disclosures of catalyst supports containing mullite but there is no indication that the mullite is of the unique type obtained by calcining kaolin and leaching silica. Further, I am aware of no prior art teaching how to obtain hard, shaped articles consisting essentially of porous mullite or how to control pore structure of such mullite in the micro, meso- and macro-size ranges.

THE INVENTION

One aspect of the present invention resides in the provision of novel particulate aggregates, preferably in the form of shaped bodies, and comprising mullite crystals as the sole or predominating solid component, the products being characterized by high surface area; e.g., greater than about 15 $m^2/g$, high pore volume, e.g., greater than about 0.22cc/g, and a high concentration of pores in the range of 150 to 350 A.

Representative products of the present invention analyze at least about 50% mullite, as determined by X-ray analysis, and preferably at least 75% mullite, and most preferably at least 85% mullite. This corresponds to a molar ratio of $Al_2O_3/SiO_2$ that is in excess of 0.5, usually in excess of 1.00 and up to about 1.65.

A preferred embodiment of the invention comprises attrition resistant bodies of predetermined size, shape and pore structure, said bodies consisting essentially of mullite, having a molar ratio of $Al_2O_3/SiO_2$ in the range of about 1.58 to 1.64, an alkali metal oxide content below about 1%, a BET surface area in the range of about 20 to 60 $m^2/g$, a total pore volume in excess of 0.35 cc/g and a pore structure in the range of 100 to 600 A characterized by a pore volume in that range of in excess of 0.1 cc/g and the greatest volume of porosity in that range centered around a pore diameter in the range of 150 A to 350 A. In one embodiment, such bodies contain a minimal amount only of pores in the macro pore size range and still in another embodiment, the bodies contain significant volume of pores in the macro size range.

The surface area and pore structure of the novel mullite products do not change appreciably when the products are heated to temperatures up to about 1200° C. Prior art porous contact material such as catalyst supports adapted for use at high temperatures such as silica, alumina in its various forms, silica-alumina, and the like, have certain disadvantages at high temperature; e.g., above about 1000° C. The desirable surface area and porosity of such products tend to be lost as the temperature of use rises above about 1000° C.

The porous mullite bodies of this invention have several distinct advantages over bodies that are made by cementing high surface area powders into shaped bodies using binders. Bodies of this invention have been fired to high temperatures to achieve the mullite conversion reaction. This high temperature calcination forms strong inter-crystalline bonds between mullite crystals, and results in excellent strength and attrition resistance for porous mullite bodies of this invention. Because porous mullite bodies of this invention contain no added binder, their desirable pore structure and surface area is not modified by other less desirable materials. Because the bodies of this invention are free of binders which can sinter and degrade, particularly at high temperatures under severe use environments, they are extremely stable and refractory. Finally, mullite aggregates possessing the aforementioned combination of desirable properties can be obtained in the form of bodies having both the size and shape useful for specific catalytic and sorptive applications; e.g., microspheres, round pellets, cylinders, and honeycombs.

Another embodiment of the invention resides in the manufacture of novel mechanically strong mullite bodies of high surface area and high pore volume from clay that is convertible to mullite and free silica by calcination by the following steps. Initially the mixture containing clay and a fugitive liquid that functions as a binder for the green (uncalcined) bodies is formed into green bodies, preferably of substantially the same shape and size (or somewhat larger size to compensate for shrinkage during calcination) as those desired in the finished product. The shaped clay-containing bodies are then heated to a temperature sufficient to convert a desired amount, preferably virtually all, of the clay to mullite plus silica. Calcination of the green bodies to produce mullite as the crystalline phase is followed with one or more alkaline leaching steps in order to remove a desired amount, which may be in part or be essentially all, of the free silica produced during calcination. In this manner pores are etched in the mullite body and the surface area is increased. The pores are of substantially uniform size, typically in the range of 150 to 350 A. The mode of the pores within this range (ie., the poe diameter comprising the greatest volume of porosity) is susceptible to control by adjustment of the severity of calcination and the extent of leaching. An alkaline solution, such as alkali metal hydroxide solution, for example sodium hydroxide, may be used advantageously at a temperature at or below the boiling point of the solution to leach silica and form pores in the bodies.

The mullite bodies of this invention contain a small amount of alkali metal after the leaching procedure. If desired, the alkali metal concentration may be reduced by extensive washing or by contacting the mullite with an aqueous solution containing hydrogen ions or precursors thereof in sufficient concentration and for a time long enough to effect the desired reduction in alkali metal content.

A preferred embodiment of the invention comprises a method for producing rigid shaped bodies consisting essentially of synthetic crystalline mullite having a predetermined pore structure which comprises the steps of: (a) providing a composition comprising hydrated clay convertible to mullite and silica (or a mixture thereof with calcined kaolin clay and/or a carbonaceous burnout agent), the particles of said clay or clay mixture having a size distribution and composition preselected to produce bodies in step (e) below which have a predetermined pore structure in the macro-pore size range, the mixture of hydrated kaolin clay with calcined clay or a mixture of hydrated clay and a carbonaceous burnout agent being used when it is desirable to produce mullite products having an appreciable volume of pores in the macro pore size range; (b) forming the composition from step (a) into self-supporting green bodies of desired shape; (c) calcining the green bodies at a temperature and for a time sufficient to decompose the kaolin clay into mullite and free silica, the temperature and time being preselected to result in the predetermined pore structure in the meso pore range after step (d) below, the calcination also resulting in hardening the bodies; (d) leaching the free silica from the calcined bodies, preferably using an alkaline solution, without destroying the shape of the bodies and without decomposing the mullite crystals; (e) recovering the bodies comprising mullite having the predetermined pore structure in the meso-(100–600 A) and macro-(600–20,000 A) pore size ranges and (f) optionally removing residual alkali in the bodies.

In another embodiment of the invention, the bodies from step (e), optionally after being treated to remove alkali, are impregnated with a catalytically active material or precursor thereof.

Another embodiment of the invention relates to an improvement in the Asphalt Resid Treatment (ART) process for preparing premium products from petroleum crude or residual stock which contain high boiling proportions contaminated by metals, high carbon content or both, which process comprises selective vaporization by contacting the stock with a finely divided inert substantially solid contact material at low cracking severity conditions of high temperatures and short hydrocarbon residence time in a rising confined column, and separating vaporous products of the contacting from said contact material bearing a combustible deposit of unvaporized high Conradson Carbon or high metal content constituents of said stock. The improvement, in accordance with the invention, comprises using as the inert contact material fluidizable microspheres consisting essentially of mullite crystals and, optionally free silica, the bodies having a molar ratio of $Al_2O_3/SiO_2$ in excess of 0.50 and up to about 1.65 and a porosity of at least 0.30 cc/g.

Still another embodiment relates to an improvement in a process for treating heavy hydrocarbon oil which contains heavy metals and/or sulfur and/or nitrogen comprising contacting the oil with hydrogen in the presence of a catalyst and recovering a hydrocarbon product having a reduced content of heavy metals, nitrogen and/or sulfur. The improvement in accordance with the invention comprises using as the catalyst one or more known catalytic metals of the group consisting of cobalt, nickel, molybdenum and tungsten supported on particles consisting essentially of mullite crystals, and optionally free silica, said bodies having a molar ratio of $Al_2O_3/SiO_2$ in excess of 0.50 and up to about 1.65 and a porosity of at least 0.30 cc/g, and a surface area at least $20 m^2/g$.

Yet another embodiment relates to an improvement in a process for the continuous cyclic fluid catalytic cracking of hydrocarbons with a cracking catalyst in the absence of added hydrogen in a reaction zone to produce lower boiling hydrocarbons wherein cracking results in the deposition on the fluid cracking catalyst particles of a solid deposit of combustible hydrocarbons and the catalyst particles containing said deposit are regenerated in a regeneration zone by oxidation in the presence of oxygen at elevated temperature to burn off said deposit, and the catalyst is recycled to said reaction zone where it is used to crack hydrocarbons in the absence of added hydrogen. The improvement in accordance with the invention comprises cycling the particles of cracking catalyst through said reaction and regeneration zones in physical admixture with a minor amount, relative to the quantity of particles of cracking catalyst, of fluidizable particles comprising a precious metal impregnated on fluidizable microspheres consisting essentially of mullite crystals and, optionally free silica, the microspheres having a molar ratio of $Al_2O_3/SiO_2$ in excess of 0.50 and up to about 1.65.

DETAILED DESCRIPTION OF THE INVENTION

RAW MATERIAL SELECTION

Clays that are suitable for conversion into porous mullite are those which, upon calcination, are converted into mullite and free silica, eg., kaolinites, halloysites, smectites, and illites.

The particle size distribution of the clay and its degree of agglomeration in the green bodies are important because these factors influence the macropore structure of the calcined body prior to leaching and this macroporosity is retained in the porous mullite after leaching. It is helpful for the calcined body to contain some porosity prior to leaching, because porosity accelerates the diffusion of reactants and products of the leaching reaction into and out of the body, and thereby shortens the necessary leaching time. Large pores can also be useful to improve the performance of certain porous mullite products. For example, large pores can be a repository for contaminant metals when porous mullite is used as a fluidizible contact material for the Asphalt Resid Treatment process, thereby extending the useful service life of the material. However, too much macroporosity can reduce the strength and attrition resistance of porous mullite shapes. Therefore, the particle size and degree of agglomeration of clay used to produce porous mullite shapes is a compromise between maximum strength (ie., minimum porosity) and some macroporosity. Clays with broad particle size distributions generally produce minimum porosity prior to leaching. An example of such a clay is ASP®900 hydrous kaolin, which contains particles up to 20 um. in diameter, an average particle size (weight basis) of ca. 1.5 um., and about 25% by weight finer than 0.5 um. Clays with a narrower particle size distribution do not pack as efficiently as clays having a broader particle size distribution, resulting in a greater quantity of macroporosity. An example of such a clay is ASP®400 hydrous kaolin, which contains particles up to 20 um. in diameter, an average particle size of ca. 5 um., and nothing <0.5 um. A good compromise between these extremes, which results in about 0.1–0.15 cc/g of macroporosity in microspheres after calcination, is ASP®600 hydrous kaolin which contains nothing coarser than about 8 um., has an average particle size of 0.9 um., and contains 35% <0.5 um. (as used herein, all particle sizes of hydrous clays in the micron-size range are those determined by sedimentation and are therefore expressed as "equivalent spherical diameter" or "e.s.d." in conventional manner.)

Macroporosity can also be increased by incorporating powdered calcined clay into the raw material mixture that is formed into the shaped body. It is believed that the calcined clay contains a significant amount of porous agglomerates that do not break down during typical forming operations. Therefore this porosity is retained in the shaped bodies. If it is desired, about 0.2–0.3 cc/g of macroporosity can be added to the shaped body by replacing about 50% of the hydrous clay with calcined clay such as Satintone® No. 1 or Satintone® No. 2 clays. Normally, however, there is sufficient porosity in the hydrous clay shape, and the addition of calcined clay is unnecessary.

Macroporosity may also be incorporated into the shaped bodies through the use of carbonaceous burn-out agents. Burn-out agents are particulate materials of the approximate size and shape of the desired porosity which are mixed with the other raw materials prior to forming the shaped body. During calcination, the burn-out materials burn substantially away, thereby imparting porosity. Some common burn-out agents are ground walnut shells, ground peanut shells, flours and carbon black.

The purity of the clay to be processed into porous mullite will depend upon the end use of the mulite body. Normally preferred are high purity clays that are low in iron, titania, alkalies, and free alumina. Presently preferred are high purity, water-washed kaolinitic clays from deposits of the type found in Georgia, such clays typically having a $SiO_2/Al_2O_3$ molar ratio of about 2/1 and containing, on a volatile-free weight basis, less than 2% $TiO_2$, less than 2% iron (measured as $Fe_2O_3$) and less than 1% total alkali and alkaline earth oxides.

When used as a support for a CO oxidation promoter in an FCCU (fluid catalytic cracking unit), transition metal impurities such as iron can catalyze undesirable dehydrogenation reactions that can result in the formation of excess coke and hydrogen. For other uses, transition metal impurities may not be objectionable. Alkali metal oxide impurities are undesirable because they are fluxes which can cause excessive sintering of the shaped body during the calcination step. It will be shown later, in Example 8, that excessive sintering can undesirably extend the time required to leach free silica from the bodies. Free alumina is undesirable because it can react with free silica from the clay to form mullite, and thereby reduce the quantity of free silica that may be leached from the body to form desirable mesoporosity.

FORMING

Forming can be conducted by conventional processes known in the art. Microspheres can be formed by spray drying a slurry of clay in water. In addition, a fugitive binder, such as polyvinyl alcohol, may be added to the slurry prior to spray drying to impart additional strength to the green microspheres prior to calcination. The preferred method to form micropheres is to prepare a slurry containing about 65 wt % of finely-divided, high purity hydrous kaolin clay (eg. ASP®600 clay), 0.3 wt % tetrasodium pyrophosphate and water; and to spray dry the slurry using a spray dryer operating with a gas inlet temperature of about 540° C. and an outlet temperature of about 120° C. This results in a microsphere which, prior to calcination, is characterized by 0.25 cc/g of macroporosity and essentially no meso- or microporosity. If a greater quantity of macroporosity is desired, some of the hydrous kaolin clay may be replced by calcined kaolin clay. For example, if about ⅓ of the hydrous clay described above is replaced with Satintone® No. 1 clay, the resultant spray dried microspheres will contain about 0.5 cc/g of macroporosity.

Cylindrical shaped bodies (pellets) in the size ranges of about 1/32" to ¼" diameter may conveniently be made by extruding a mixture of about 3 parts high purity Georgia kaolin clay (eg., ASP®800 clay) and 1 part water using an auger-type extruder. This mixture has resulted in about 0.1 cc/g of macroporosity, and essentially no meso- or microporosity prior to leaching.

Other forming procedures can be utilized.

CONVERSION TO MULLITE AND SILICA

Control of calcination conditions (time and temperature) influences several properties, including:

(1) sintering of the shaped body, (which influences both leachability and the macropore volume of the porous mullite product);

(2) the degree of clay conversion to mullite and free silica; and (3) the pore size in the mesopore (100–600 A diameters) region and surface area of the porous mullite product.

Useful calcining temperatures are those which give conversion of clays to mullite plus free silica in practically useful times. Good results have been achieved by calcining for as long as about 16 hours at 1150° C., or for about a time as short as <1 hour at about 1350° C. Below about 1150° C. the time required for conversion from clay to mullite plus free silica is generally unacceptably long. At or above 1350° C. sintering can be excessive, thereby reducing porosity of the calcined body and extending the required leaching time.

Within the range of useful calcining times and temperatures, calcination time and temperature may be used to control the surface area and average pore size in the mesopore range (100–600 A diameter) of the porous mullite product. Increasing calcining time and/or temperature results in a leached porous mullite product of lower surface area and larger mesopore size. Finally, increasing the calcining time and temperature improves the strength and attrition resistance of the porous mullite product. In general, good results have been achieved with 2 to 3 hours of calcination at about 1250° C.

SILICA REMOVAL

Free silica is removed from the calcined bodies by leaching with strong alkali solutions. Removal of this free silica results in the formation of porosity in the mesopore size range and an increase in surface area in the resultant product. The solubility of silica increases sharply when the pH of the leaching solution reaches about 11, and solubility continues to incease with increasing pH. Silica solubility is not particularly sensitive to the cation associated with the hydroxyl ion. Therefore, preferred leaching reagents are those providing the greatest pH at the least cost. Good results have been obtained using aqueous solutions containing 10–25% by weight NaOH. Silica solubility also increases with increasing temperature, and therefore, it is advantageous to conduct the leaching step at as high a temperature as possible. However, to avoid the need for costly high pressure reactors, it is advantageous to leach at temperatures at or below the boiling point of the leaching solution. Good results have been obtained using a leaching temperature of about 80° C.

Leaching time is dependent upon several factors including:

(1) the quantity of free silica to be removed;
(2) the porosity of the body prior to leaching;
(3) concentration of the leaching solution; and
(4) temperature of leaching.

With microspheres containing about 0.1–0.15 cc/g of macroporosity prior to leaching, about 1 hour of leaching with 25% NaOH solution at 80° C. was sufficient to achieve equilibrium conditions. Three such leaching steps were sufficient to remove essentially all free silica.

When leaching microspheroidal bodies, it is preferred to form a slurry of the microspheres in the leaching solution and to stir the slurry slowly to maintain the microspheres in suspension and to insure good agitation of the reagents. It is impractical to stir mixtures of the leaching solution when removing silica from larger shaped bodies such as pellets or honeycombs. Therefore, it is preferable to pump the leaching solution through a bed of the larger shaped bodies.

Complete removal of free silica typically results in the formation of about 0.25 cc/g of mesoporosity. If less than 0.25 cc/g of mesoporosity is desired, it may be realized by terminating the leaching procedure prior to complete removal of silica. Partial leaching will also result in a somewhat lower surface area for the leached product and a somewhat smaller pore size in the mesopore range.

USES OF POROUS MULLITE

Preferred uses for the porous mullite products of this invention are those taking advantage of their unique combination of high pore volume (particularly mesoporosity), controllable surface area (from moderate to high), e.g., from 15 to 60 $m^2/g$), excellent refractoriness, high strength. Some examples are listed below:

SUPPORT FOR CATALYST USED TO OXIDIZE CARBON MONOXIDE OR HYDROCARBONS

These catalysts generally consist of one or more metals such as Pt or Pd on an oxide support. Because the oxidation reaction is highly exothermic, these catalysts can operate at temperatures typically up to about 1300° C. At these temperatures, many common supports, such as transition aluminas, experience an appreciable loss of surface area. In contrast, the surface area of porous mullite is relatively unaffected by such high temperatures. Porous mullite honeycomb shaped bodies comprising parallel channels with openings of about 1.5 mm across and walls about 0.4 mm thick and having a surface area of about 50 $m^2/g$ would be particularly useful as a support for a precious metal automobile exhaust catalyst.

Microspheroidal porous mullite articles having a surface area between about 20 $m^2/g$ and 50 $m^2/g$ and hardness at least comparable to that of commercially useful fluid cracking catalysts would be useful as a support for a precious metal promoter for the oxidation of carbon monoxide in the regenerator of a fluidized catalytic cracking unit (FCCU). When petroleum oils are cracked in an FCCU, a carbonaceous material (so-called "coke") is built up on the particles of the cracking catalyst. In the FCCU, coked catalyst is transferred from the cracking reactor to the catalyst regenerator where, in a fluidized bed, it is contacted with oxygen-containing gases at temperatures between about 600° C. and 760° C. and the coke is burned off. Carbon monoxide oxidation promoters are used to maximize the amount of CO that is oxidized to $CO_2$ in the fluidized dense bed of the regenerator. If an excessive amount of CO escapes the dense bed, it can oxidize downstream of the dense bed, resulting in undersirable afterburning. This can result in overheating and damage to the FCCU or to equipment used to handle the regenerator flue gas.

A CO oxidation promoter can be made by impregnating porous mullite microspheres to incipient wetness with a chloroplatinic acid solution of the appropriate concentration to result in from about 100 to 500 ppm of Pt being deposited on the support. The resultant moist material may be dried prior to adding it to the FCCU, or it may be added in the moist state, whereupon it would be dried by the high temperatures of the FCCU.

HYDROPROCESSING CATALYSTS

Hydroprocessing catalysts are generally composed of Co and Mo or Ni and Mo or Ni and W supported on alumina or silica-alumina. A typical hydrodesulfurization catalyst may contain about 1-4% Co and 3-12% Mo. Such catalysts are used to remove undesirable sulfur and nitrogen compounds from petroleum streams.

When processing petroleum streams that contain large amounts of contaminant metals, such as petroleum residua containing 2200 ppm of Ni and/or V, the contaminant metals accumulate in the pores of the catalyst and reduce the activity of the catalyst. Katzer et al, in the *Chemistry of Catalytic Processes*, McGraw Hill, 1979, report that while there are conflicting data in the literature regarding an optimum pore structure, it is clear that a catalyst with a large pore volume is preferred for hydroprocessing metals contaminated streams. Tam et. al. (Ind. Eng. Chem. Process Res. Dev., 1981, 20, 262-273) report that small pores, < about 200 A diameter, would have their diameters significantly constricted by metals deposits. Therefore, porous mullite (which can have few if any pores <100 A in diameter, ca 0.25 cc/g of pores of about 250-300 diameter., and up to about 0.4 cc/g of pores having diameters >600 A) has a pore structure that is well suited to hydroprocessing of metals-containing petroleum streams.

ASPHALT RESIDUAL PROCESSING (U.S. Pat. No. 4,263,128

It is believed that porous mellite microspheres of the invention having in excess of 0.4 cc/g of porosity will have a reduced tendency to agglomerate when repeatly recycled between the contactor and burner, whereby metals levels gradually build up as a deposit on the inert contact material.

DEFINITION AND DETAILS OF TEST PROCEDURES USED HEREIN

Identification of mullite crystal phase using X-ray powder diffraction:

X-ray Powder Diffraction File, Card No. 15-776, Leonard G. Berry (Ed.) Joint Committee on Powder Diffraction Standards*, 1972 was used as the reference for the mullite X-ray powder diffraction pattern.
*1601 Park Lane, Swarthmore, Pa. 19081
Surface Area and volume of pores in range of 20-100 A:

The surace area and volume of pores having diameters in the range of 20-100 A were determined by conventional nitrogen adsorption and desorption techniques, respectively, using a Micromeritics ® Digisorb 2500 Automatic Multi-Gas Surface Area and Pore Volume Analyzer. Before being tested for surface area and volume of pores having diameters in the range of 20-100 A, the material being tested was first pretreated by heating under vacuum at about 250° C. for 16 hours.
Volume of Pores in ranges of 30-20,000 A and 600-20,000 A:

The volume of pores having diameters in the range of 600-20,000 A was determined by a conventional mercury intrusion porosimetry technique using a scanning mercury porosimeter manufactured by Quantachrome Corp. The relationship between pore diameter and intrusion pressure was calculated using the Washburn equation and assuming a contact angle of 140° and a surface tension of 484 ergs/cm$^2$. Before being tested for volume of pores having diameters in the range of 600-20,000 A, the materials being tested were pretreated by heating them in air to about 350° C. for one hour and then cooling them in a dessicator. The mercury intrusion porosimetry technique described above, including the pretreatment of the materials being tested, was also used to determine the volumes of pores having diameters in the range of 30-20,000 A referred to in this application.
Dodecane Pore Volume:

The total volume of pores measured by wetting to incipient wetness with dodecane.
Micropores:

Pores having diametrs below 100 A as determined by nitrogen porosimetry.
Mesopores:

Pores having diameters in the range of 100 to 600 A by mercury porosimetry.
Macropores:

Pores having diameters in the range of 600 to 20,000 A by mercury porosimetry.
Mode:

Within any pore size range, the mode of the porosity is defined as the single pore diameter which contains the greatest volume of porosity. A mode exists wherever the standard Hg pore size intrusion curve exhibits an inflection from concave upwards to concave downwards.

The following examples are given to further illustrate the invention.

EXAMPLES 1-4

A fine size fraction (about 80% by weight finer than 2 microns, equivalent spherical diameter) of high purity hydrated Georgia kaolin clay was formed into a 62.5 percent solids deflocculated aqueous slip by agitating the clay in water in the presence of tetrasodium pyrophosphate in amount of about 0.3 percent of the clay weight. The slip was spray dried to produce microspheres employing air inlet and outlet temperatures of approximately 1100° and 450° F., respectively. A minus 60 mesh (Tyler) fraction of microspheres was recovered by screening. The microspheres of hydrated kaolin clay were calcined in a rotary calciner just past the characteristic exotherm to convert the clay into the so-called "spinel phases". The microspheres were exposed to a maximum temperature in the range of about 980° C. to 1100° C. for a time in the range of about ½ to 2 hours. The calcined microspheres were further calcined in a muffle furnace at 1250° C. for 40 minutes to produce mullite and free silica. These microspheres contained about 40% mullite by weight as determined by standard quantitative X-ray relative to a 100% mullite standard. Mullite was the only crystalline phase detectable by X-ray. The surface area of the microspheres was 3 m$^2$/g and pore volume was 0.13 cc/g in 30-20,000 A diameter pores.

In Example 1, one hundred fifty grams (150 g) of these microspheres were slurried in a solution formed from 171.5 g of deionized water and 35.1 g of sodium hydroxide pellets. With slow continued stirring the slurry was heated to 82° C. and held at that temperature for two hours. Thereafter the slurry was vacuum filtered and washed with deionized water. This sample was designated Example 1 and represents incompletely leached mullite microspheres.

In Example 2, thirty grams of the product of Example 1 was leached further by slurrying in 100 g. of 25% sodium hydroxide solution, heating to 82° C. and maintaining the slurry at this temperature for 1 hour with agitation, and subsequently vacuum filtering and washing with deionized water. The leaching procedure was repeated three more times. The final product was designated Example 2. Chemical analysis for silica in the leachate solution showed essentially no silica after the third leaching step.

Examples 3 and 4 illustrate a method for lowering the sodium content of microspheres produced in Examples 1 and 2. Portions of the products of Example 1 and Example 2 were slurried separately in 2M ammonium nitrate solution for 0.5 hours. The pH was adjusted to about 3 with nitric acid for the duration of the immersion. The samples were then vacuum filtered, washed with deionized water and air-dried at 110° C. for 2 hours. Pore volume and surface area measurements were then made on products of the Examples 1 to 4. Surface area was determined by the standard BET method using nitrogen, and the pore volumes were determined by incipient wetness with dodecane. The results are shown in Table 1.

TABLE II

THERMAL STABILITY OF HIGH SURFACE AREA, HIGH PORE VOLUME NOVEL MULLITE MICROSPHERES

| Product | BET Surface Area ($m^2/g$) | |
|---|---|---|
| | Before Calcination | After Calcination |
| Example 1 | 35 | 33 |
| Example 4 | 50 | 49 |

Within the accuracy of the numbers obtained, no loss in surface area upon calcination was evident. When the test was repeated at 1200° C. with other samples, surface area loss on the order of about 10% was observed.

EXAMPLES 5–7

In these examples the effect of various calcination conditions for the mullitization reaction is shown.

Three batches of a sample of microspheres of kaolin clay that had been calcined through the exotherm to the spinel phase and were calcined at 1250° C. for different periods of time (Examples 5, 6 and 7). Mullite content was determined before and after leaching by quantitative X-ray. Leaching was carried out by preparing a slurry containing hydroxide solution, heating to 82° C., maintaining the slurry at this temperature for 1 hour

TABLE I

PROPERTIES OF HIGH SURFACE AREA, HIGH PORE VOLUME MULLITE MICROSPHERES

| Product | Chemical Composition (wt. %) | | | | | Dodecane Pore Vol (cc/g) | BET Surface Area, $m^2/g$ |
|---|---|---|---|---|---|---|---|
| | $Na_2O$ | $Al_2O_3$ | $SiO_2$ | $Fe_2O_3$ | $TiO_2$ | | |
| Mullitized microspheres (no leaching) | — | ~45 | ~51 | — | — | 0.13 | 3 |
| Example 1 | 1.00 | 66.2 | 29.1 | 0.56 | 2.72 | 0.40 | 35 |
| Example 2 | 0.46 | 69.4 | 25.9 | 0.72 | 3.50 | 0.56 | — |
| Example 3 | 0.10 | 66.4 | 29.8 | 0.66 | 2.78 | — | — |
| Example 4 | 0.07 | 69.4 | 25.8 | 0.79 | 3.49 | — | 47 |

Data in Table I show that the ammonium washed materials (Examples 3 and 4) were characterized by low $Na_2O$ levels, 0.10% or below, and the substantially completely leached microspheres of Examples 2 and 4 possessed higher pore volume and surface area than those of Example 1.

The products of Example 1 and Example 4 were further tested for thermal stability by calcining in a muffle furnace for one hour at 1000° C. The surface area before and after this treatment was measured by BET nitrogen method as before; the results are shown below in Table II.

with agitation, and subsequently vacuum filtering and washing with deionized water. The leaching procedure was repeated two more times. This procedure was repeated for the other three samples of microspheres.

The surface of all samples after leaching were also measured by BET method using nitrogen. Porosity was determined by mercury intrusion. The results are shown in TABLE III:

TABLE III

SURFACE AREA AND MULLITE CONVERSION AS FUNCTION OF CALCINATION CONDITIONS

| Sample | Calcination Time at 1250° C. | Pre-leach % Mullite | Post-leach % Mullite | Post-leach BET Surface Area ($m^2/g$) | Hg. Pore Vol 30–20,000 A dia cc/g |
|---|---|---|---|---|---|
| Example 5 | 40 min. | 43% | 75% | 50 | .51 |
| Example 6 | 1 hr. | 49% | 84% | 33 | .51 |
| Example 7 | 16 hrs. | 54% | 88% | 27 | .48 |

As shown in the Table III, longer calcination times increased mullite content and resulted in decreased surface area after leaching, but total porosity was unchanged.

EXAMPLE 8

This example illustrates that excessive sintering during calcination is undesirable. A sample of microspheres of kaolin clay obtained by spray drying a slurry of hydrated kaolin clay, as described in Example 1, were calcined to metakaolin condition. The metakaolin condition is achieved by dehydrating kaolin clay at a temperature and for a time sufficient to dehydrate the kaolin, but insufficient for spinel formation to occur (eg. 2 hr. at 700° C.). The microspheres were then additionally calcined at different temperatures sufficient for mullite formation to occur for a period of one hour. The samples were then leached using the procedure of Examples 5-7. The effect of mullitization temperature on the properties of the resulting material is illustrated in Table IV along with results for Example 6 for purposes of comparison:

TABLE IV

EFFECT OF TEMPERATURE OF MULLITIZATION ON PROPERTIES OF MULLITE MICROSPHERES

|  | EXAMPLE 6 | EXAMPLE 8 |
|---|---|---|
| Calcination Temperature | 1250° C. | 1350°C. |
| Calcination Duration | 1 hour | 1 hour |
| Pre-leach Mullite Content | 49% | 53% |
| Post-Leach Mullite Content | 84% | 62% |
| Post-leach BET Surface Area (m²/g) | 33 | 10 |
| Post-leach Hg Pore Volume (cc/g, 30-20,000 A diameter range) | 0.51 | 0.18 |
| Post-leach Chemical Analysis |  |  |
| Al$_2$O$_3$ | 68.9 | 52.7 |
| SiO$_2$ | 26.2 | 43.2 |

As shown in Table IV, higher mullite content was realized by carrying out the mullitization reaction at higher temperature, but surface area and pore volume (pores in the 30-20,000 A range measured by standard mercury porosimetry techniques) after leaching decreased dramatically. The chemical analysis of the post-leach materials showed that the 1350° C. material had a higher silica content.

Data for Example 8 indicate that fully leached porous mullite could not be made under the conditions employed from microspheres of kaolin clay that had been calcined to 1350° C. Only a small amount of silica was removed from the calcined microspheres by leaching, and the resultant leached material had a surface area of only about 10 m²/g and a pore volume of only 0.18 cc/g (vs. 30-50 m²/g and 0.5 cc/g for typical porous mullite of the invention.)

Initially it was believed that 1350° C. calcined microspheres containing crystalline silica were more resistant to alkali leaching than were microspheres containing amorphous silica. Further testing, the results of which are reported in Table V, showed that this hypothesis was incorrect. This further testing revealed that the reason for the poor leaching response of 1350° C. calcined microspheres was not their crystalline silica. Data in Table V show that microspheres calcined 16 hours at 1250° C. also contained crystalline silica (tridymite), but they were readily leached. After leaching, the pore volume (0.48 cc/g) and chemical analysis (Al$_2$O$_3$/SiO$_2$=1.55) were typical of porous mullite of the invention. Surface area, (33 m²/g), was on the low end of the range for typical porous mullite of the invention, but pore size distribution analyses indicated that this was due to larger leached pore size, not less silica removal. Based on these results, its apparent that the crystalline silica in these microspheres was easily leached.

It was concluded that the reason for the poor leaching characteristics of microspheres converted into mullite and silica at 1350° C. was excessive sintering during calcination. As data in Table IV show, microspheres that could be leached to produce porous mullite all contained a small amount (about 0.12 cc/g) of "open" porosity (Hg pore volume), whereas there was almost no open porosity (0.01 cc/g) in the microspheres that did not leach well. Apparently some open porosity in the calcined kaolin shape is highly advantageous for the preparation of porous mullite.

A shortage of open porosity can, however, be compensated by extending the leaching time. Microspheres calcined for 1 hour at 1350° C. were leached as in Example 8, except the leaching time was extended from 1 hour to 3 hours. The alumina and silica contents of these leached microspheres were 69.0% and 26.6%, indicating that extended leaching resulted in complete removal of the free silica.

TABLE V

EFFECT OF POROSITY OF MULLITIZED KAOLIN MICROSPHERES PRIOR TO LEACHING ON POROSITY AND SURFACE AREA AFTER LEACHING

| CALCINATION CONDITIONS | | PROPERTIES PRIOR TO LEACHING | | PROPERTIES AFTER LEACHING | | |
|---|---|---|---|---|---|---|
| | | | | | | Chemical Analysis |
| Temp. (°C.) | Time (Hrs) | Quantity tridymite | Hg Pore Vol (cc/g) | BET Surface Area (m2/g) | Hg Pore Vol (cc/g) | Al$_2$O$_3$/SiO$_3$ Mole Ratio |
| 1250 | ⅔ | Trace | 0.13 | 50 | 0.51 | 1.59 |
| 1250 | 16 | Major | 0.10 | 33 | 0.48 | 1.55 |
| 1350 | 1 | Major | 0.01 | 10 | 0.18 | 0.72 |

*Al$_2$O$_3$/SiO$_2$ Kaolin = 0.5
Al$_2$O$_3$/SiO$_2$ Mullite = 1.5

EXAMPLE 9

This example illustrates the reduction of sodium content in caustic leached mullite microspheres by contact with an aqueous solution of nitric acid.

Six hundred grams (600 g) of kaolin microspheres were calcined and leached as in Example 6 to produce high surface area mullite microspheres. The sodium content was found to be about 0.23% by weight (expressed as Na$_2$O). These microspheres were slurried in 1500 g of deionized water under continuous agitation at room temperature (about 23° C.). The slurry was then acidified to a pH of about 4.0 by addition of nitric acid. Stirring was continued for 30 minutes, and the slurry was filtered, washed with water and dried. The dried microspheres analyzed about 0.04% by weight Na$_2$O.

EXAMPLE 10

Hydrous kaolin extrudates were prepared by mixing 6480 g of ASP ®800 kaolin clay with 2060 g of H$_2$O and extruding the mixture into pellets in an International pilot plant scale extruder.

TABLE VI

| | SYNTHESIS CONDITIONS | | | | | | | N₂ Pore Vol. 20-100A. (cc/g) | Hg PORE SIZE DIST. | | | |
|---|---|---|---|---|---|---|---|---|---|---|---|---|
| Formed Shape | Calc. Temp. (°C.) | Calc. Time (Hr) | Mullite Index (%) | NaOh Conc. (w/o) | Time Per Leach (Hr) | No. of Leaches | BET S.A. (m²/g) | | Vol. 35-100A. dia. (cc/g) | Vol. 100-600A. dia. (cc/g) | Mode in 100-600A. range (A.) | Vol. 600-20KA. range (cc/g) |
| Honeycombs | 1250 | ⅔ | 49 | 25 | 3 | 6 | 45.3 | 0.000 | .006 | .360 | 300 | .381 |
| 3/16" | 1230 | 7 | 54 | 25 | 1 | 0 | | | .005 | .004 | — | .105 |
| dia. | 1230 | 7 | 54 | 25 | 1 | 1 | | | .009 | .042 | 270 | .139 |
| extrud. | 1230 | 7 | 54 | 25 | 1 | 2 | | | .006 | .090 | 290 | .144 |
| extrud. | 1230 | 7 | 54 | 25 | 1 | 4 | | | .001 | .143 | 310 | .175 |
| extrud. | 1230 | 7 | 54 | 25 | 1 | 6 | | | .001 | .199 | 290 | .193 |
| extrud. | 1230 | 7 | 54 | 25 | 1 | 8 | | | .005 | .210 | 310 | .200 |
| extrud. | 1230 | 7 | 54 | 25 | 3 | 1 | | | .005 | .105 | 310 | .151 |
| extrud. | 1230 | 7 | 54 | 25 | 3 | 2 | | | .005 | .176 | 300 | .183 |
| extrud. | 1230 | 7 | 54 | 25 | 3 | 4 | | | .003 | .216 | 320 | .209 |
| extrud. | 1230 | 7 | 54 | 25 | 3 | 6 | | | .002 | .241 | 310 | .228 |
| extrud. | 1230 | 7 | 54 | 25 | 3 | 8 | | | .006 | .245 | 350 | .236 |

The extrudates were cut into pellets of nominally 1 cm. length and dried overnight at room temperature. About 500 g of the dried extrudates was calcined for 7 hours at 1230° C. to prepare extrudates of kaolin that had been calcined substantially to mullite. In addition, a hydrous kaolin honeycomb that had been prepared by the GENERAL REFRACTORIES CO. from ASP®900 kaolin, using proprietary procedures, was calcined for ca. 40 minutes to 1250° C. to prepare a honeycomb of kaolin that had been calcined substantially to mullite.

The shaped bodies (pellets and honeycombs) were then leached with sodium hydroxide solution by the following procedure. A 4 cm. diameter by 15 cm. long vertical column reactor was loaded ca. ½ to ¾ full with the material to be leached, and then sufficient sodium hydroxide solution of the desired concentration was added to cover the sample (leaving about a 1 cm. layer of solution above the sample). Sodium hydroxide solution was circulated upwards through the vertical column by pumping with a Masterflex pump. The sample and the sodium hydroxide solution were then heated to about 82° C. for the desired leaching time. Timing was started when the sample reached 82° C. After the desired leaching time, the sample was removed from the apparatus and washed with deionized water for about ½–1 hour. If additional leaching was desired, the above procedure was repeated. Samples of leached extrudates (ca. 10 ) were usually taken after the first, second, fourth, sixth, and eighth leaching. Occasionally samples were taken at other times as shown in the TABLE VI. Each sample was dried at room temperature prior to making analyses reported in the table.

As found with leaching studies carried out with calcined clay in the form of microspheres, leached clay that had been calcined to mullite and free silica did not exhibit a great deal of porosity with diameters of <100 A. Most of the porosity consisted of pores in the 100–600 A dia. range that were formed during the leaching operation, and of pores in >600 A dia. range that were mostly present in the calcined extrudates prior to leaching. A similar experiment with kaolin microspheres that were calcined to contain 54% mullite (Example 7) produced a surface area in the range of 27 m²/g. The honeycomb had a mullite content of about 49%. Like the leached extrudates, the leached honeycomb contained few pores of <100 A dia., but it had a much higher surface area (45 m²/g). This result is consistent with experiments with microspheres, in which surface area of the leached product was found to be inversely related to the mullite index of the calcined kaolin (Examples 5, 6, and 7).

EXAMPLE 11

Cobalt and molybdenum were impregnated on porous mullite pellets in the following manner. About 50 ml of porous mullite extrudates having a total pore volume of about 0.5 cc/g were dried for about 2 hours at 120° C. and cooled to room temperature. The pellets were transferred to a glass jar, covered with 60 ml of an aqueous solutions containing 24 g of $(NH_4)_6MO_7O_{24}.4H_2O$., the jar was sealed, and the pellets were slowly agitated to remove trapped air bubbles. After about 15 minutes, the excess solution was removed from the pellets by vacuum filtration. The pellets were dried for about 1½ hours at 120° C. and cooled to room temperature. The pellets were then transferred to a glass jar, covered with a 60 ml of air aqueous solution containing 33 g of $Co(NO_3)_2.6H_2O$. The jar was sealed and the pellets were slowly agitated to remove trapped air bubbles. After 15 minutes, the excess solution was removed from the pellets as above, and they were dried for about 1½ hours at 120° C. The sample was then calcined for 1 hour at 590° C. Chemical analysis showed that the sample contained 4.0% cobalt and 7.3% molybdenum.

EXAMPLE 12

This example illustrates the utility of the product of the invention in the form of fluidizable attrition resistant microspheres in the ART process. A sample of fluidizable microspheres of kaolin clay that had been calcined to the spinel phase was used as a raw material in the preparation of fluidizable porous microspheres consisting essentially of mullite. The microspheres of calcined clay used as the starting material had been produced substantially as described in Example 1.

Portions of the microspheres calcined to the spinel phase were calcined for 17 hours at 1200° C. to convert the clay into a mixture of mullite and free silica. Silica was then extracted by three successive caustic leaches each performed with a 25% sodium hydroxide solution for 1 hour at 82° C. One portion of the leached product was slurried at a pH of about 3.5, substantially as described in Example 9, to reduce the sodium content. Another portion was washed and dried without pH adjustment (Sample B). Chemical analysis of samples A and B are reported in Table VII.

Physical properties of Sample A were measured and are as follows: mercury pore volume—0.47 cc/g; B.E.T. Surface Area—20.8 m²/g. The hardness as determined by the Engelhard Attrition Index ("EAI") was 1.1%/sec, which is comparable to that of many fluidizable cracking catalyst used in commercial FCCU.

TABLE VII
PROPERTIES OF LEACHED MULLITE MICROSPHERES

| Sample | Chemical Analyses Weight % | | | | | |
|---|---|---|---|---|---|---|
| | Na | LOI | $Al_2O_3$ | $SiO_2$ | $Fe_2O_3$ | $TiO_2$ |
| A | 0.06 | 0.33 | 71.16 | 26.65 | 0.65 | 2.82 |
| | | 1.01 | 70.30 | 26.56 | 0.81 | 2.81 |
| B | 0.26 | 4.78 | 69.37 | 26.81 | 0.93 | 2.79 |

Samples A and B were then evaluated for utility in the ART process by a MAT procedure (duplicate runs) at conditions of C/O=5, WHSV=15, 488° C., reactor temperature. The MAT procedure is a standard microactivity test that measures the amount of gas oil converted to gas, gasoline and coke by contact with the solid being evaluated in a fixed bed. The charge in that test is an Mid-Continent Gas Oil of 27° API. In three tests carried out in Sample B, weight percent conversion ranged from 7.3 to 7.8%; weight percent hydrogen from 0.14 to 0.19 and weight percent coke from 2.20 to 2.55%. Sample B exhibited weight percent conversion of 4.5 percent; weight percent hydrogen of 0.07; and weight percent coke of 2.80.

Other samples of microspheres of the invention were prepared by a variation of the procedure described above and evaluated for utility in the selective vaporization process. Microspheres composed of mullite and silica were prepared by further calcining fluidizable microspheres of kaolin that had been calcined to the metakaolin condition. Microspheres of clay calcined to metakaolin condition were prepared by spray drying high purity hydrated Georgia Kaolin clay as described in Example 1 except that calcination was carried out at a lower temperature to convert the hydrated clay to the metakaolin phase. The portions of microspheres of metakaolin were calcined in a muffle furnace for 7 to 17 hours and then treated with 25% sodium hydroxide solution for one hour at 82° C. three separate times. Each residue was then slurried at pH 3.5 for 30 minutes and dried. Pertinent properties are summarized in Table VIII. Results of testing by the MAT procedure are presented in Table IX.

Samples of the porous mullite microspheres (described in Tables VIII and IX) and an unleached spinel phase control were impregnated with five and eight weight percent nickel and vanadium (V/Ni ration=4.0) and steam aged for four hours at 760° C. in 100% steam. The samples were then treated in a static bed for 48 hours at 870° C., 100% steam. The measurement of agglomeration tendency was the change in the mean or median particle size as a result of the steam treatment. It was found that the leached microsphere samples had a significantly lower agglomeration tendency (small changes in particle size) compared to the less porous control material.

TABLE VII
PROPERTIES OF LEACHED MULLITE MICROSPHERES

| | Chemical Analysis (wt. %) | |
|---|---|---|
| | Calcined 1260° C., 7 hours | Calcined 1260° C., 17 hours |
| LOI | 0.79 | 1.30 |
| $Al_2O_3$ | 67.21 | 64.01 |
| $SiO_2$ | 28.84 | 31.71 |
| $Fe_2O_3$ | 0.95 | 0.84 |
| $TiO_2$ | 2.68 | 2.71 |
| $Na_2O$ | 0.09 | 0.12 |
| $P_2O_5$ | 0.15 | 0.19 |

TABLE IX
MAT STUDIES OF POROUS MULLITE MICROSPHERES

| Sample No. (description) | Weight Percent | | |
|---|---|---|---|
| | Conversion | Hydrogen | Coke |
| calcined 1260° C., 7 hours | 11.12 | 0.23 | 2.95 |
| | 10.43 | 0.23 | 2.46 |
| | 10.03 | 0.24 | 2.55 |
| calcined 1260° C., 17 hours | 9.03 | 0.15 | 2.32 |
| | 7.41 | 0.15 | 2.29 |
| | 7.66 | 0.17 | 2.40 |
| Control (microspheres calcined to spinel phase) | 11.5 | 0.05 | 0.98 |

I claim:

1. In a process for treating heavy hydrocarbon oil which contains heavy metals and/or sulfur comprising contacting said oil with hydrogen in the presence of a catalyst and recovering a hydrocarbon product having reduced content of heavy metals and/or sulfur, the improvement which comprises using as the catalyst one or more catalytic metals of the group consisting of cobalt, nickel, molybdenum and tungsten impregnated on porous supporting bodies consisting essentially of mullite crystals, and optionally free silica, said bodies having a molar ratio of $Al_2O_3/SiO_2$ in excess of 0.50 and up to about 1.65 and having few, if any pores <100 A in diameter and up to about 0.4 cc/g of pores having diameters >600 A, said porous supporting bodies having been prepared by the method comprising calcining bodies of kaolin clay at a temperature in the range of about 1150° C. to about 1350° C. until the clay is converted into mullite and free silica, leaching the resulting bodies of calcined clay with an alkaline aqueous solution to remove at least a portion of said free silica, washing the leached clay bodies to remove alkali ions, drying and then recovering the resulting porous supporting bodies consisting essentially of mullite crystals.

* * * * *